US012482540B2

(12) United States Patent
Livathinos et al.

(10) Patent No.: US 12,482,540 B2
(45) Date of Patent: Nov. 25, 2025

(54) SYNTHETIC DATA SET GENERATION OF CHEMICAL ILLUSTRATIONS

(71) Applicant: INTERNATIONAL BUSINESS MACHINES CORPORATION, Armonk, NY (US)

(72) Inventors: Nikolaos Livathinos, Adliswil (CH); Maksym Lysak, Waedenswil (CH); Ahmed Samy Nassar, Zurich (CH); Peter Willem Jan Staar, Wädenswil (CH); Valery Weber, Gattikon (CH); Gerhard Ingmar Meijer, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 256 days.

(21) Appl. No.: 18/124,638

(22) Filed: Mar. 22, 2023

(65) Prior Publication Data

US 2024/0321412 A1 Sep. 26, 2024

(51) Int. Cl.
*G06F 3/048* (2013.01)
*G06F 40/103* (2020.01)
*G06F 40/143* (2020.01)
*G06F 40/186* (2020.01)
*G16C 20/80* (2019.01)

(52) U.S. Cl.
CPC .......... *G16C 20/80* (2019.02); *G06F 40/103* (2020.01); *G06F 40/143* (2020.01); *G06F 40/186* (2020.01)

(58) Field of Classification Search
CPC ..... G16C 20/80; G06F 40/103; G06F 40/186; G06F 40/143
See application file for complete search history.

(56) References Cited

U.S. PATENT DOCUMENTS 10,013,467 B1 * 7/2018 Brogle .............. G06F 16/24575
10,133,949 B2  11/2018 Taranta, II et al.
10,635,939 B2   4/2020 Watson et al.
(Continued)

OTHER PUBLICATIONS

Beard et al., "ChemSchematicResolver: A Toolkit to Decode 2D Chemical Diagrams with Labels and R Groups into Annotated Chemical Named Entities", Journal of Chemical Information and Modeling, 2020, vol. 60, pp. 2059-2072.
(Continued)

*Primary Examiner* — David Phantana-angkool
(74) *Attorney, Agent, or Firm* — Jordan T. Schiller

(57) ABSTRACT

The invention is notably directed to a computer-implemented method to generate a synthetic data set. The synthetic data set comprises a plurality of chemical documents and each of the plurality of chemical documents comprises a respective set of chemical objects. The method comprises a step of receiving configuration data, the configuration data comprising a set of configuration parameters for the data set. The method further comprises performing, in an iterative manner, for each of the plurality of chemical documents the steps of generating, by a structure generation module, a respective document structure for each of the respective chemical documents in accordance with the configuration data, generating, by a content generation module, the respective set of chemical objects for the respective chemical document and arranging the respective set of chemical objects on the respective chemical document.

20 Claims, 14 Drawing Sheets

(56) References Cited

U.S. PATENT DOCUMENTS

| | | | |
|---|---|---|---|
| 10,726,304 | B2 | 7/2020 | Hotson et al. |
| 10,755,115 | B2 | 8/2020 | Avidan et al. |
| 10,993,687 | B2 | 5/2021 | Itu et al. |
| 11,022,880 | B2 | 6/2021 | Kawaue et al. |
| 11,144,579 | B2 * | 10/2021 | Bull .................... G06F 16/3347 |
| 11,354,495 | B2 * | 6/2022 | Hegde .................. G06F 40/186 |
| 11,636,172 | B2 * | 4/2023 | Ciabarra, Jr. ......... G06F 40/194 |
| | | | 715/234 |
| 11,675,817 | B1 * | 6/2023 | Pratik .................... G06N 3/047 |
| | | | 707/740 |
| 2012/0324340 | A1 * | 12/2012 | Arkhipov .............. G06F 40/117 |
| | | | 715/235 |
| 2014/0115007 | A1 | 4/2014 | Harvey et al. |
| 2017/0199865 | A1 * | 7/2017 | Ciancio-Bunch ..... G06F 16/954 |
| 2020/0050104 | A1 | 2/2020 | Hatakeyama et al. |
| 2020/0133121 | A1 | 4/2020 | Domon et al. |
| 2020/0320371 | A1 | 10/2020 | Baker |
| 2021/0019368 | A1 * | 1/2021 | Ahamed ............... G06F 40/205 |
| 2021/0157980 | A1 * | 5/2021 | Bilu ......................... G06N 3/08 |
| 2021/0350880 | A1 * | 11/2021 | Aykol .................... G16C 60/00 |
| 2022/0027374 | A1 * | 1/2022 | Brown .................... G06N 3/088 |
| 2022/0130494 | A1 | 4/2022 | Woodbury et al. |
| 2023/0386623 | A1 * | 11/2023 | Godwin, Jr. ........... G16H 20/10 |
| 2023/0401274 | A1 * | 12/2023 | Denninghoff ...... G06Q 30/0251 |
| 2024/0321412 | A1 * | 9/2024 | Livathinos ............ G06F 40/103 |
| 2025/0217626 | A1 * | 7/2025 | Martin .................. G06N 3/0455 |

OTHER PUBLICATIONS

Github, "COCO, Common Objects in Context" Data Format, accessed on Mar. 10, 2023, 4 pages, https://cocodataset.org/#format-data.

Hormazabal et al., "CEDe: A collection of expert-curated datasets with atom-level entity annotations for Optical Chemical Structure Recognition", Submitted to the 36th Conference on Neural Information Processing Systems (NeurIPS 2022) Track on Datasets and Benchmarks, Jun. 6, 2022, 12 pages.

IBM, "Accelerated Discovery", Accessed on Mar. 10, 2023, 8 pages, https://research.ibm.com/topics/accelerated-discovery.

IBM, "Deep Search", accessed on Mar. 8, 2023, 5 pages, https://ibm.biz/deepsearch/

Jain, "Molecule synthesis using AI", Towards Data Science, Sep. 25, 2019, 8 pages.

Nassar et al., "TableFormer: Table Structure Understanding with Transformers", arXiv:2203.01017v2, Mar. 11, 2022, 16 pages.

Weir et al., "ChemPix: automated recognition of hand-drawn hydrocarbon structures using deep learning", Chem. Sci, 2021, vol. 12, pp. 10622-10633.

* cited by examiner

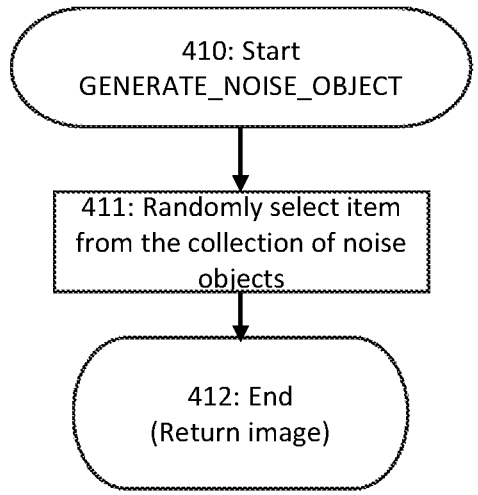

Configuration file (example)

```
"generator": {
    "type": "ChemTabGenerator03",
    "dataset_size": 20,
    "split_ratios": {"train": 0.8, "val": 0.1, "test": 0.1},
    "header_rows_limits": [0, 0],
    "nrows_limits": [2, 10],
    "ncols_limits": [1, 3],
    "span_types": ["colspan", "2dspan"],
    "max_colspan": 2,
    "span_coverage": 0.1,
    "header_spans_only": false,
    "styles": ["chem_style.css"],
    "source_images_dir": "/source_images/SynthChem/images/",
    "content_type_ratios": {"empty": 0.0, "trash": 0.1, "image": 0.9},
    "save_dir": "/synthchemnet//SynthChem/save/",
    "rendering_batch_size": 3,
    "save_debug": true,
    "bucketing_cache": 2000
}
```

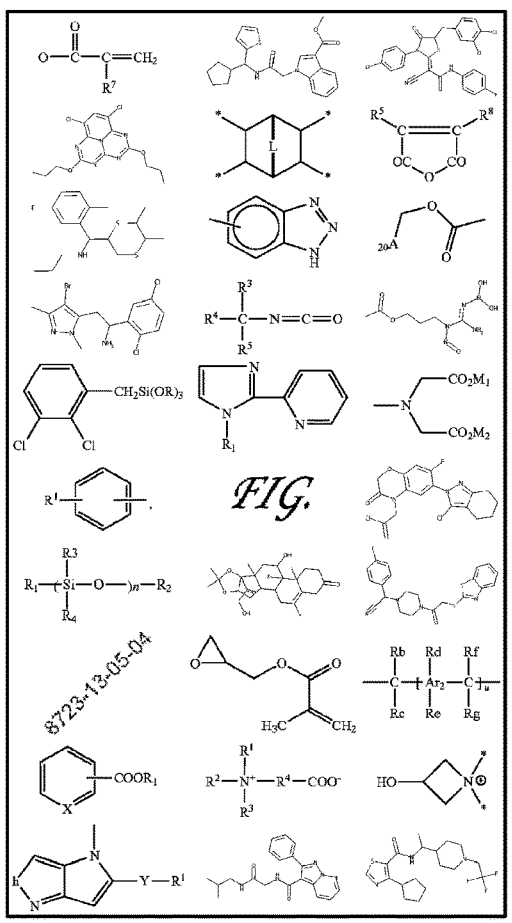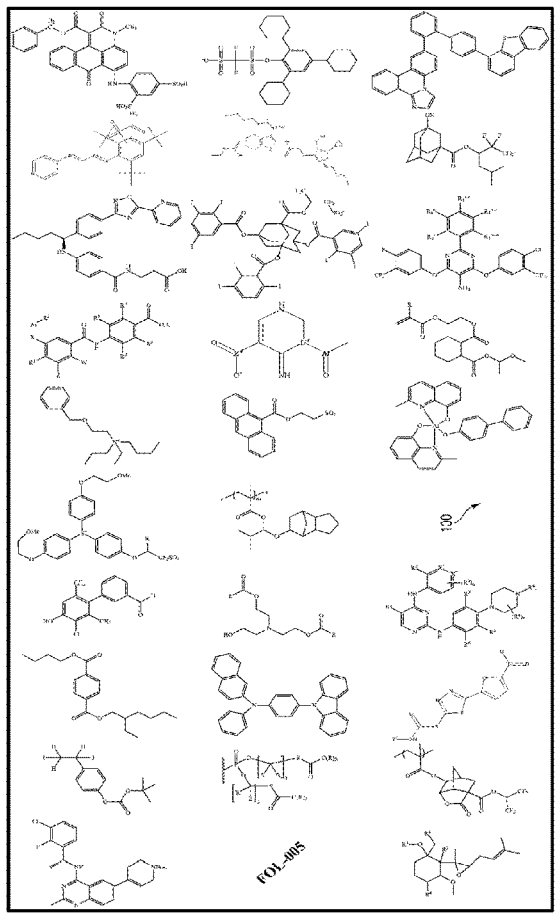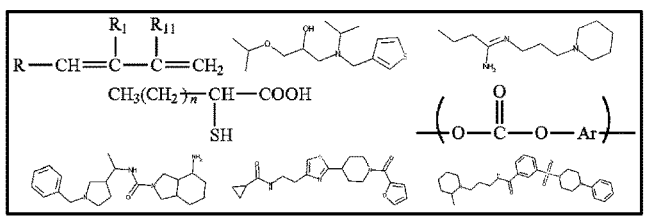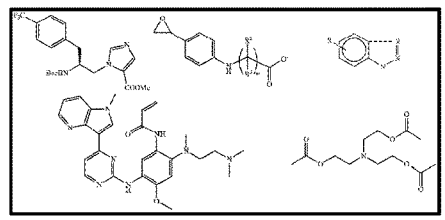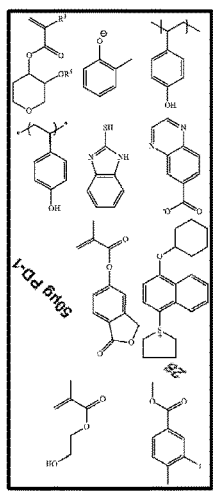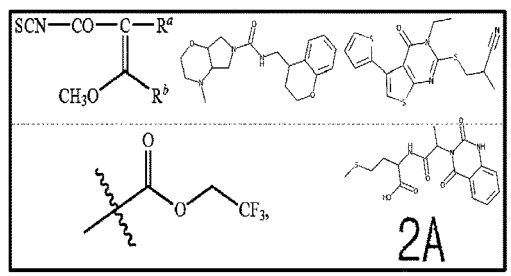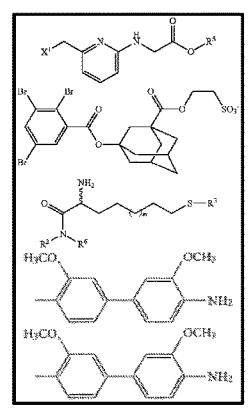
FIG. 12

TEMPLATE
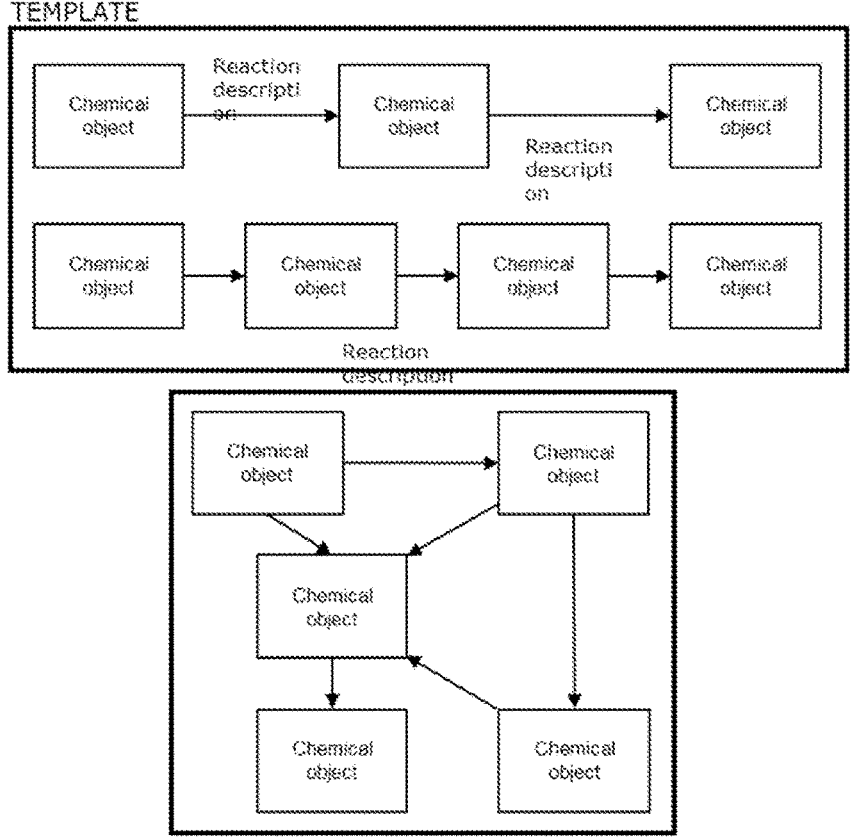
EXAMPLE
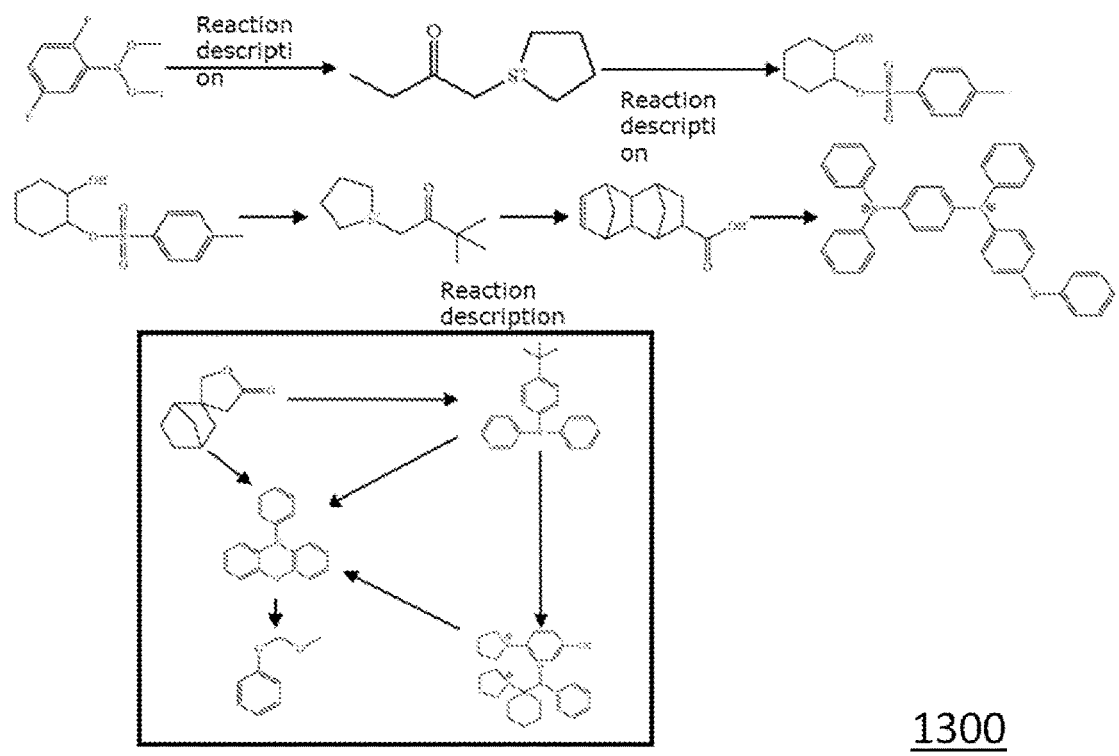
1300
FIG. 13

TEMPLATE
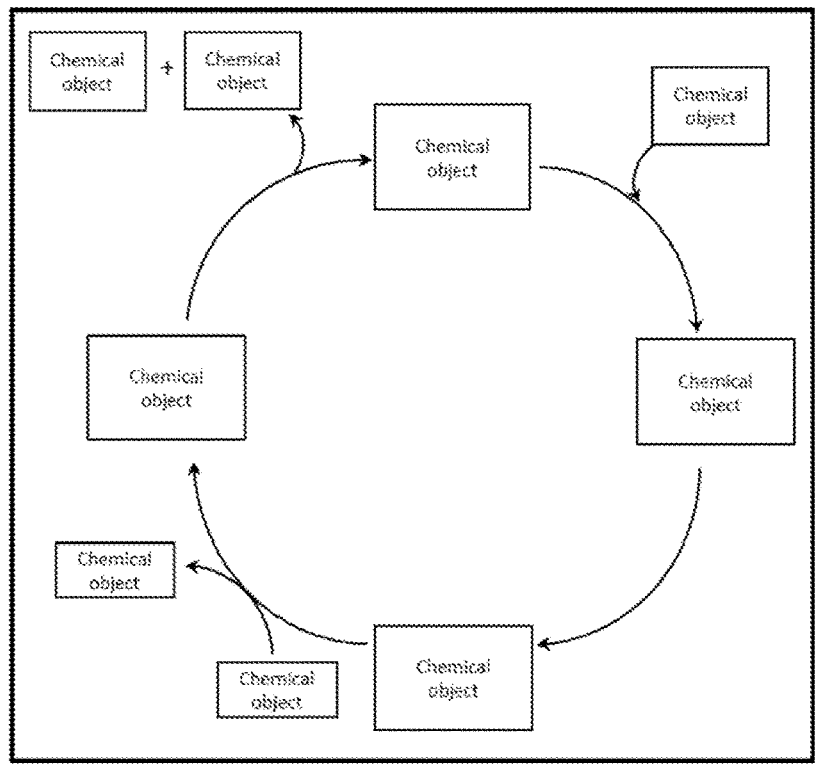
EXAMPLE
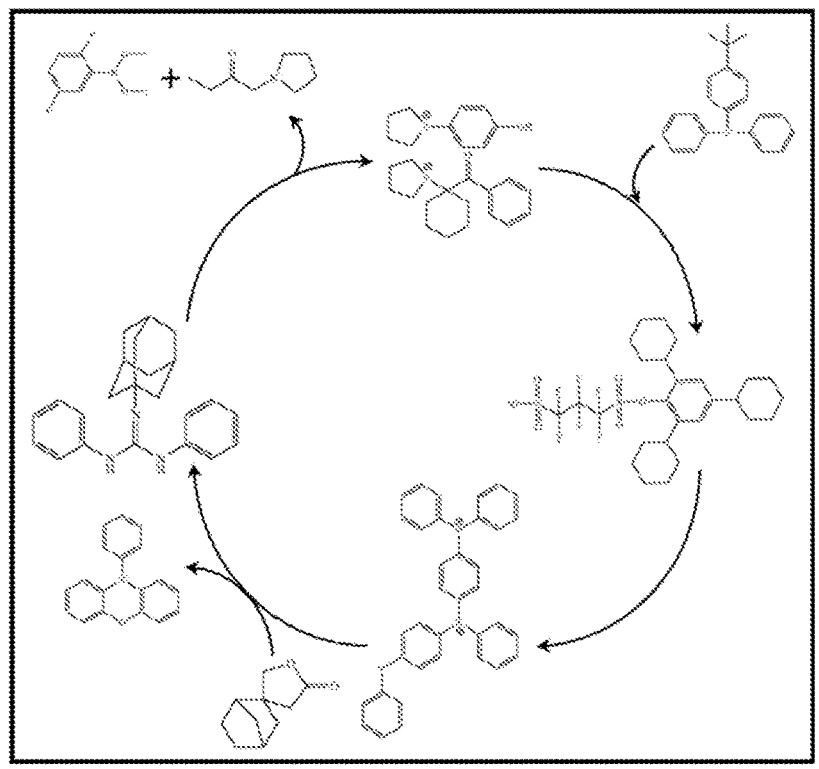
1500
FIG. 15

SYNTHETIC DATA SET GENERATION OF CHEMICAL ILLUSTRATIONS

BACKGROUND

The present invention relates to a computer-implemented method to generate a synthetic data set comprising a plurality of chemical documents.

The present invention further relates to a corresponding system and a corresponding computer program product.

The recognition of molecular structures inside documents is a well-known problem in the field of artificial intelligence (AI), which has multiple applications in many different domains (scientific documents, patents, chemical industry, pharmaceuticals etc.). Real-world documents use a wide variety of chemical illustration layouts with different representations of the molecular structures. Usually, multiple chemical illustrations are packed together with additional figures (e.g., marketing material, technical drawings, etc.) to produce an aesthetically appealing document.

Thus, it is critical for the performance of a corresponding AI model to have a training data set which is big enough and matches the appearance of real-life documents as close as possible. Moreover, given the broad spectrum of layouts used in different domains, it is desirable to have collections of training datasets which are specialized for each scope.

One possible approach is to develop such datasets manually. However, this is labor intensive and may introduce additional issues such as inconsistencies in the data format due to errors introduced during the manual annotation, fixed/limited appearance styles, long dataset development times and high costs and/or limited dataset size.

Accordingly, there is a need for methods which facilitate the generation of such synthetic data in an efficient way.

SUMMARY

According to a first aspect, the invention is embodied as a computer-implemented method to generate a synthetic data set. The synthetic data set comprises a plurality of chemical documents and each of the plurality of chemical documents comprises a respective set of chemical objects. The method comprises receiving configuration data, the configuration data comprising a set of configuration parameters for the synthetic data set. The method further comprises performing, in an iterative manner, for each of the plurality of chemical documents the following: generating, by a structure generation module, a respective document structure for each of the plurality of chemical documents in accordance with the configuration data; generating, by a content generation module, the respective set of chemical objects for each of the plurality of chemical documents; and arranging the respective set of chemical objects on each of the plurality of chemical documents.

Such an embodied method may allow to generate synthetic data sets comprising a plurality of chemical documents in an efficient and automated way. By means of the configuration parameters of the configuration data, a fully parametrized method and system can be provided to generate synthetic datasets with chemical illustrations. In particular, embodiments of the invention allow to generate complex layouts of chemical structures on the same image.

According to an embodiment, the chemical objects are selected from the group consisting of molecules, Markush structures and reaction setups. This supports the generation of multiple realistic looking layouts for chemical illustrations.

According to an embodiment, the respective document structure is selected from a group consisting of a tabular structure, a synthesis structure, a retrosynthesis structure and a circular reactions structure. This supports the generation of multiple realistic looking layouts for chemical illustrations.

According to an embodiment, the plurality of chemical documents is embodied as single page documents or single image documents. This supports the generation of multiple realistic looking layouts for chemical illustrations.

According to an embodiment, the performing, in an iterative manner, for each of the plurality of chemical documents, comprises selecting randomly for each of the plurality of chemical documents a style template from a set of style templates, the style template comprising style information, and applying the style information of the style template on each of the plurality of chemical documents.

This supports the generation of multiple realistic looking layouts for chemical illustrations.

According to an embodiment, generating the respective set of chemical objects for each of the plurality of chemical documents comprises selecting randomly a chemical object file from a chemical database. This is a particularly efficient method which allows the use of multiple chemical databases.

According to an embodiment, the method further comprises randomly injecting noise objects into each of the plurality of chemical documents.

This facilitates a realistic looking layout of the generated chemical documents.

According to an embodiment of another aspect a system for performing a computer-implemented method for generating a synthetic data set for applications for the analysis of chemical documents is provided. The synthetic data set comprises a plurality of chemical documents, each of the plurality of chemical documents comprising a respective set of chemical objects, the system comprising a processor and a computer readable memory. The system is configured to receive configuration data. The configuration data comprises a set of configuration parameters for the synthetic data set. The system is further configured to perform, in an iterative manner, for each of the plurality of chemical documents the steps of: generating, by a structure generation module, a respective document structure for each of the plurality of chemical documents in accordance with the configuration data, generating, by a content generation module, the respective set of chemical objects for each of the plurality of chemical documents and arranging the respective set of chemical objects on each of the plurality of chemical documents.

According to an embodiment of another aspect a computer program product for generating a synthetic data set for applications for the analysis of chemical documents by a system comprising a processor and computer readable memory is provided. The synthetic data set comprises a plurality of chemical documents. Each of the plurality of chemical documents comprises a respective set of chemical objects. The computer program product comprises a computer readable storage medium having program instructions embodied therewith, the program instructions executable by the system to cause the system to perform a method comprising receiving configuration data and performing, in an iterative manner, for each of the plurality of chemical documents the steps of generating, by a structure generation module, a respective document structure for each of the plurality of chemical documents in accordance with the configuration data, generating, by a content generation module, the respective set of chemical objects for each of the plurality of chemical documents and arranging the respective set of chemical objects on each of the plurality of chemical documents.

According to an embodiment of another aspect a synthetic data set obtainable by a method according to the method aspects of the invention is provided.

According to an embodiment of another aspect a computer-implemented method for training an application for the analysis of chemical documents is provided. The method comprises receiving a synthetic data set according to the pervious aspect and training a cognitive model with the synthetic data set.

Embodiments of the invention will be described in more detail below, by way of illustrative and non-limiting examples, with reference to the accompanying drawings.

BRIEF DESCRIPTION OF THE SEVERAL VIEWS OF THE DRAWINGS

FIG. 4 shows a flow-chart of a method according to embodiments of the invention for generating noise objects;

FIG. 5 shows an exemplary example of a configuration file embodying configuration data;

FIG. 12 shows exemplary synthetic datasets where the generated chemical documents have a tabular structure;

FIG. 13 shows exemplary synthetic datasets where the generated chemical documents have a synthesis structure;

FIG. 15 shows exemplary synthetic datasets where the generated chemical documents have a circular reactions structure;

DETAILED DESCRIPTION

Figure 1:
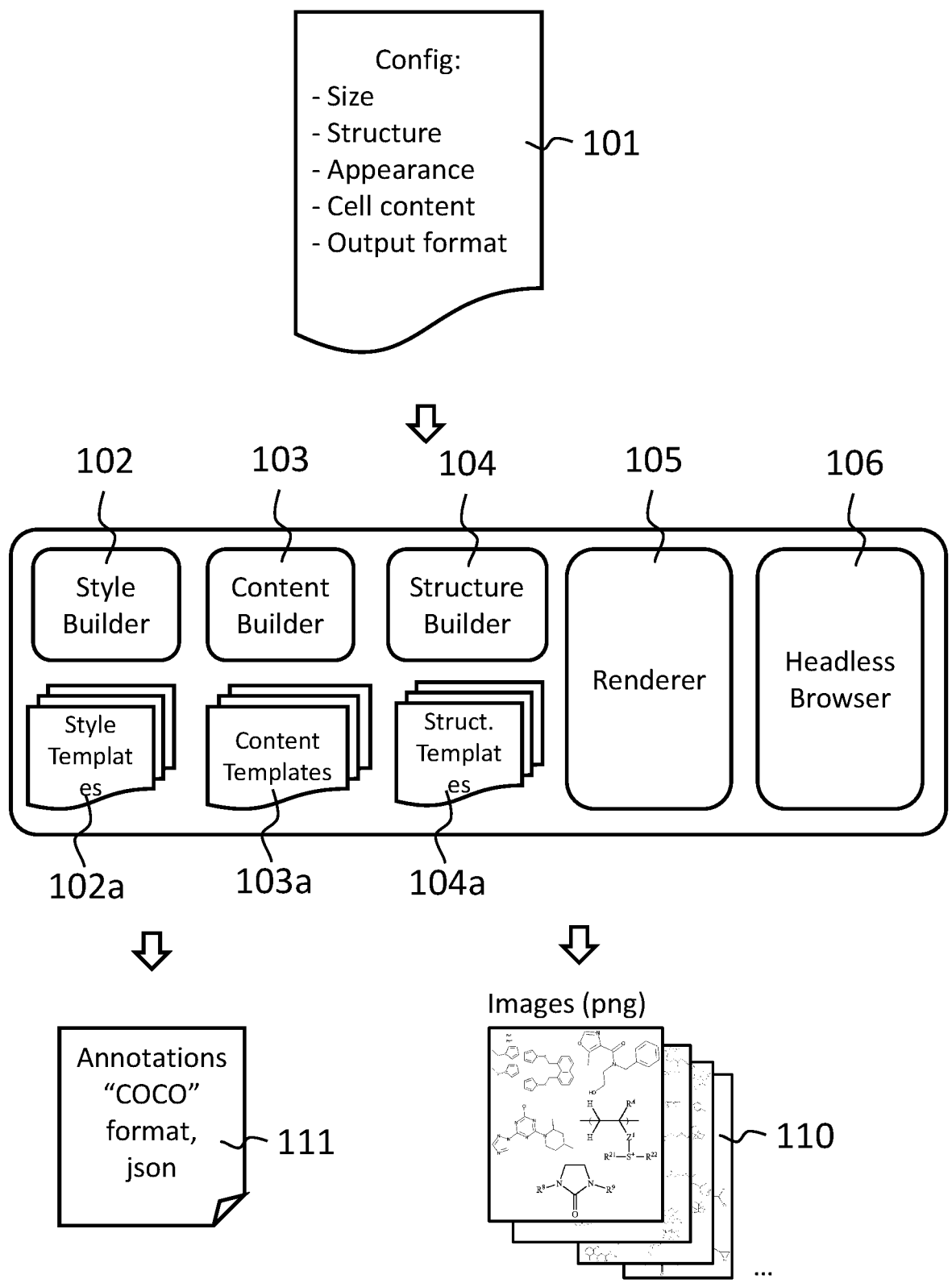
FIG. 1 illustrates a high-level flow chart and corresponding components of a computer-implemented method to generate a synthetic data set comprising a plurality of chemical documents according to an embodiment of the invention.

In reference to FIGS. 1-18, some general aspects and terms of embodiments of the invention are described.

Molecule: The illustration of a chemical structure.

Markush structure: Markush structures are used to indicate a family of related Molecules.

Noise Object: Generally, any none-chemical objects, in particular random images such as arrows, captions, labels, texts, plots, and technical drawings.

Reaction Setup: An illustration for the condition of a chemical reaction.

Domain object: Elements of the generated dataset. A domain object can be a Molecule, a Markush Structure, a Noise Object or a Reaction Setup.

SMILES: Simplified Molecular-Input Line-Entry System. A specification in the form of a line notation for describing the structure of chemical species using short ASCII strings.

Segmentation Mask: The process of assigning a label to every pixel in an image such that pixels with the same label share certain characteristics.

Table Structure: According to embodiments, a table structure may be used as document structure of the chemical documents. Each table may consist of a header and a body. Both parts consist of cells and each cell can span horizontally (colspan) or vertically (rowspan). According to embodiments, all generated tables have a rectangular shape after taking into account any cell spans.

A table grid may refer to a rectangular table structure that can be decomposed into "squares" of equal size. Each cell may normally occupy one square but spanned cells may occupy more than one square. For example, a cell with colspan=2 occupies the current square and the square right to it. Or a cell with rowspan=2 occupies the current square and the square below it. The grid size is the number of squares in each dimension.

Embodiments of the invention disclose a parametric system for the generation of synthetic datasets with complex layouts of chemical illustrations. Such complex layouts may also be denoted as atlases.

A system according to embodiments of the invention may have a modular architecture which comprises several modules such as "atlases generators", "chemical illustration content", and "visual styles".

Embodiments of the invention may use a headless browser to render content, in particular html/css content as images, in particular as images in PNG-format, TIFF-format, JPEG-format or other graphic formats.

The modular structure may enable a fully parametrized generation of the synthetic datasets via a configuration file. This allows to customize the appearance, the structure, and the content of the generated chemical documents/atlases.

According to embodiments, the generated synthetic dataset may be used for training of a corresponding machine-learning application, but also for other purposes such as evaluation, testing, and others.

According to embodiments, the Java Script Object Notification Data Interchange Format (JSON-Format) may be used as data format, in particular for annotation files and configuration files. According to such an embodiment any of the specifications of JSON-Format by Douglas Crockford, e.g., RFC 8259, or any specifications of the JSON-Format by ECMA, e.g., ECMA 404 or any specifications of the JSON-Format by the International Standards Association, e.g., ISO/IEC 21778:2017, may be used.

According to embodiment, the Hypertext Markup Language (HTML) as developed by the Worldwide Web Consortium and as standardized in particular by ISO/IEC 15445, W3C HTML 5, 3C HTML 4.0, W3C HTML 3.2 or any further versions may be used as data format. According to further embodiment, Latex, Markdown or XML may be used.

According to embodiments the synthetic datasets are provided in the COCO format (COMMON OBJECTS IN CONTEXT) which is a large-scale object detection, segmentation, and captioning dataset. This facilitates the use of the generated synthetic data sets to train and/or evaluate AI models.

According to embodiments, CSS (Cascading Style Sheets) may be used as style templates. CSS-files are files that describe how HTML elements shall be displayed.

A conformer of a molecule shall be understood according to embodiments as an isomer of a molecule that differs from another isomer by the rotation of a single bond in the molecule. A conformer may be also denoted as a conformational isomer.

A tabular structure of a chemical document shall denote a document structure which comprises a table, wherein the table may comprise a plurality of table cells. The table cells may be in particular squares or rectangles. The tabular structure may comprise a plurality columns and a plurality of rows. Each of the cells may be populated with a domain object such as a molecule, a Markush structure or a noise object or a reaction setup.

A synthesis structure of a chemical document shall denote a document structure which illustrates a chemical synthesis. A chemical synthesis shall denote a process by which one or more chemical reactions are performed which may convert one or more starting materials into one or more products.

A retrosynthesis structure of a chemical document shall denote a document structure which illustrates a chemical retrosynthesis. A retrosynthesis shall in particular denote the transformation of a target molecule into simpler precursor structures.

A circular reactions structure of a chemical document shall denote a document structure which illustrates a chemical circular reaction such as a catalytic cycle.

FIG. 1 shows a high-level flow chart 100 and corresponding components of a computer-implemented method to generate a synthetic data set comprising a plurality of chemical documents according to an embodiment of the invention.

At first, a configuration file 101 is generated, e.g., by a developer which plans to use the synthetic dataset for a respective application. The configuration file may specify the size, the structure, the appearance, the cell content and the output format of the chemical documents that shall be generated. The configuration file may be in particular in the json-format.

A style builder module 102 may be used to prepare a plurality of style templates 102a, which may be e.g., CSS files.

A content builder module 103 may be used to prepare a plurality of content templates 103a for preparing content of the chemical documents.

A structure builder module 104 may be used to prepare a plurality of structure templates 104a for defining structure of the chemical documents.

A renderer module 105, e.g., an HTML renderer, may be used to load the generated content, in particular content in HTML-format, into a headless browser 106.

The headless browser 106 may be used to generate the chemical documents as annotated images, in particular in the COCO-format. The use of a headless browser facilitates the use of a set of technologies such as HTML, CSS and DOM (Document Object Model) that helps to extract bounding boxes of various generated elements for annotations.

As a result of the method, synthetic datasets may be generated comprising a plurality of chemical documents 110, in particular a plurality of images with complex chemical structures or in other words atlases of chemical structures.

Furthermore, annotation files 111 are provided.

The synthetic dataset may then be used e.g., to train an AI model.

The generated dataset may use the COCO data format (https://cocodataset.org/#format-data) according to embodiments.

Figure 2:
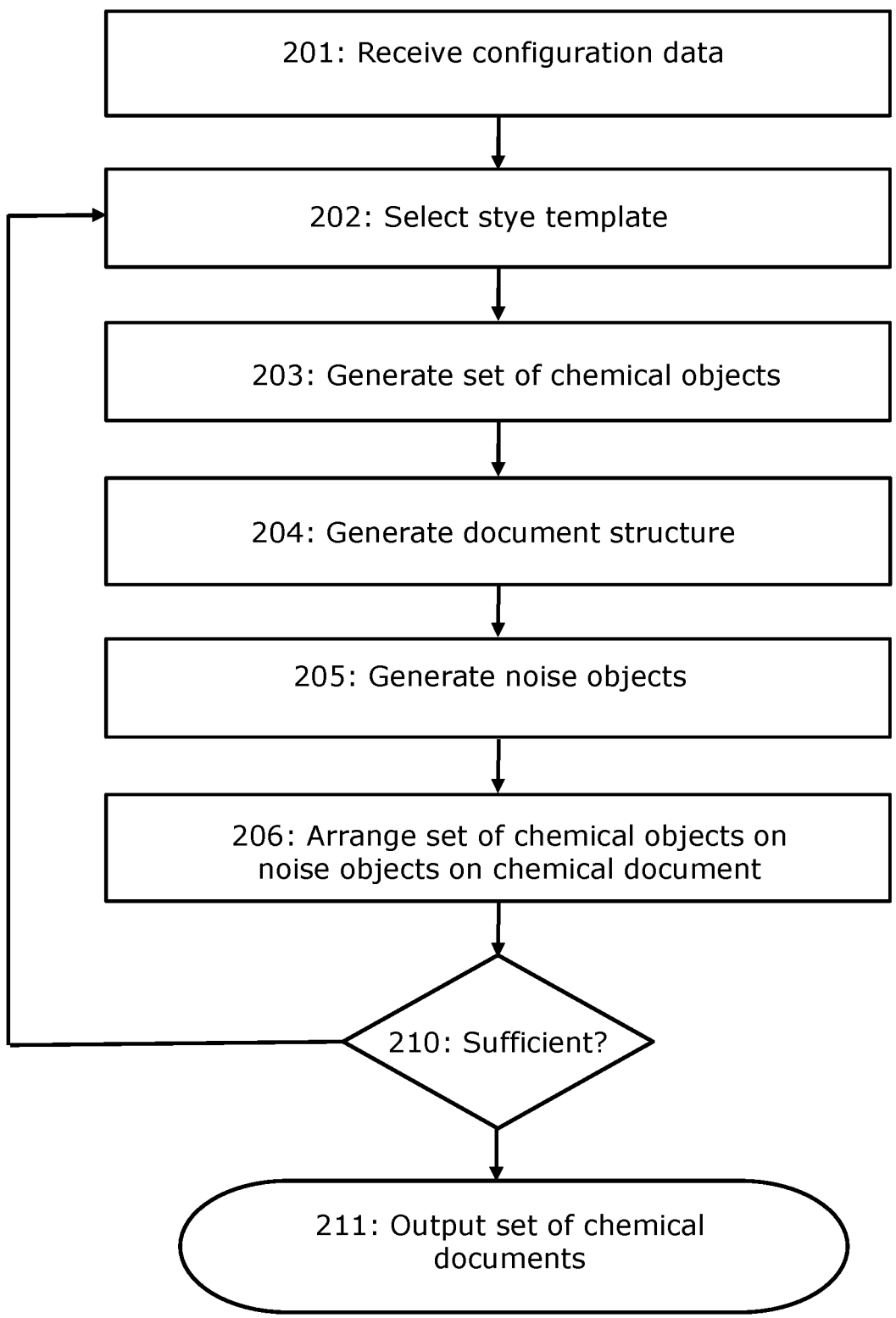
FIG. 2 shows a flow chart of a computer-implemented method to generate a synthetic data set comprising a plurality of chemical documents according to an embodiment of the invention.
Figure 16:
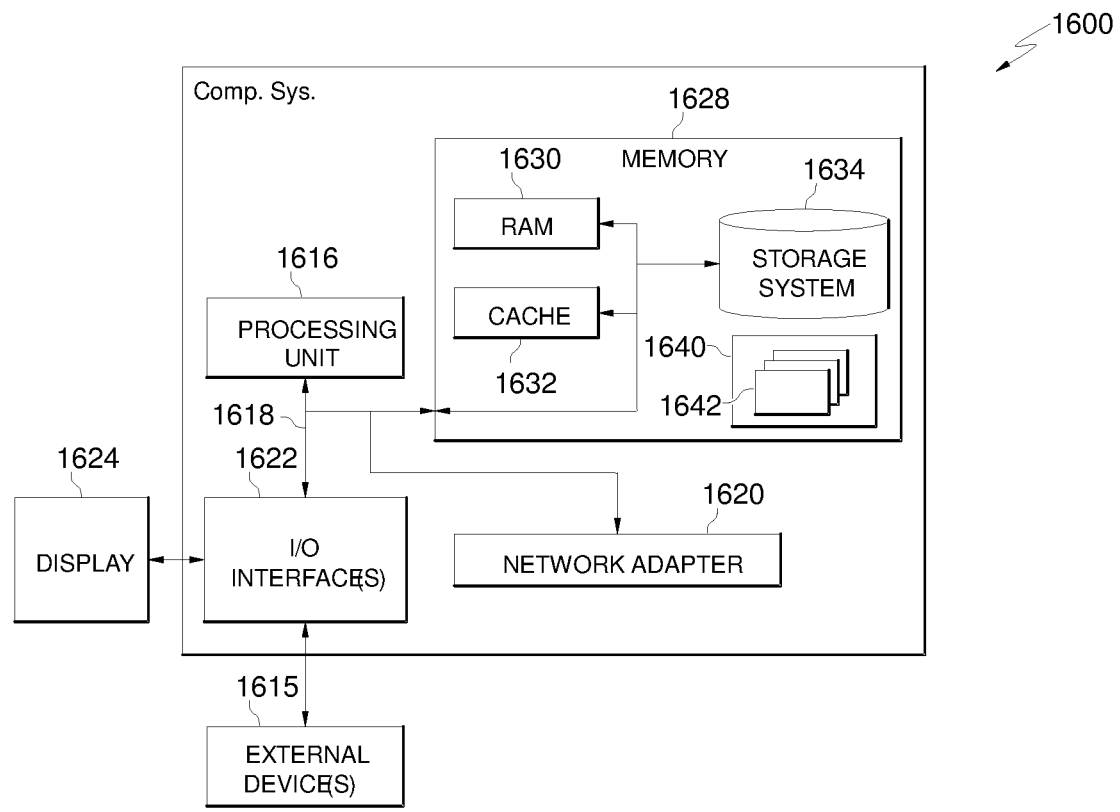
FIG. 16 shows a more detailed block diagram of a computing system according to an embodiment of the invention.

FIG. 2 shows a flow chart 200 of a computer-implemented method to generate a synthetic data set comprising a plurality of chemical documents according to an embodiment of the invention. The method by be performed by a computing system, e.g., the computing system 1600 as shown in FIG. 16.

At a step 201, configuration data is received by the computing system. The configuration data may comprise a set of configuration parameters for the synthetic data set.

Then, steps 202, 203, 204, 205 and 206 are performed in an iterative manner for each of the plurality of chemical documents that shall be synthetically generated.

At the step 202, a style template 102a is selected randomly from a set of style templates which may be provided e.g., by the style builder module 102. The style templates comprise style information that shall be applied on the respective chemical document.

At the step 203, the content builder module 103 may generate the respective set of chemical objects for the respective chemical document and may select a corresponding content template 103a.

At the step 204, the structure builder module 104 generates a respective document structure for each of the respective chemical documents in accordance with the configuration data. The structure builder module 104 may select one of the plurality of structure templates 104a.

At the step 205, a plurality of noise objects are generated. The noise objects may be generated by the content builder module 103 or by a separate module.

At the step 206, the respective set of chemical objects and the noise objects may be arranged on the respective chemical document.

At a step 210, it is checked whether a sufficient number of chemical documents has been generated. This may include a check of one or more predefined criteria. If the one or more predefined criteria have been fulfilled, the respective set of chemical documents is output at a step 211. Otherwise, the method continues again with step 202.

Methods and systems according to embodiments of the invention may fully support CSS (Cascading Style Sheets). This may be used to diversify look and feel of generated chemical documents. In particular, it may allow to have full control over padding, margin, alignment, border styling for the individual chemical and other domain objects. According to embodiments, a plurality of variations of background and foreground color may be provided. The use of CSS may facilitate the development of a collection of different style or in other words appearance templates.

Methods according to embodiments of the invention may generate all kinds of domain objects. This may include chemical objects such as molecules, Markush structures, and reaction setups as well as noise objects.

According to embodiments, SMILES may be used to generate molecules and Markush structures.

According to embodiments, the database PubChem (https://pubchem.ncbi.nlm.nih.gov/) as well as other chemical databases may be used.

To facilitate the coverage of a large variety of chemical image styles, the rendering module 105 may randomly select depiction parameters, such as font size for atom labels, bond thickness, orientation of the molecule and abbreviation of common functional groups. The rendering component 105 may also generate different molecule conformers.

According to embodiments, Markush structures may be created in the same way as molecules with additional randomly inserting R-groups, position variation, and repeating units. A set of noise objects may have been compiled and curated manually.

Figures 3A, 3B:
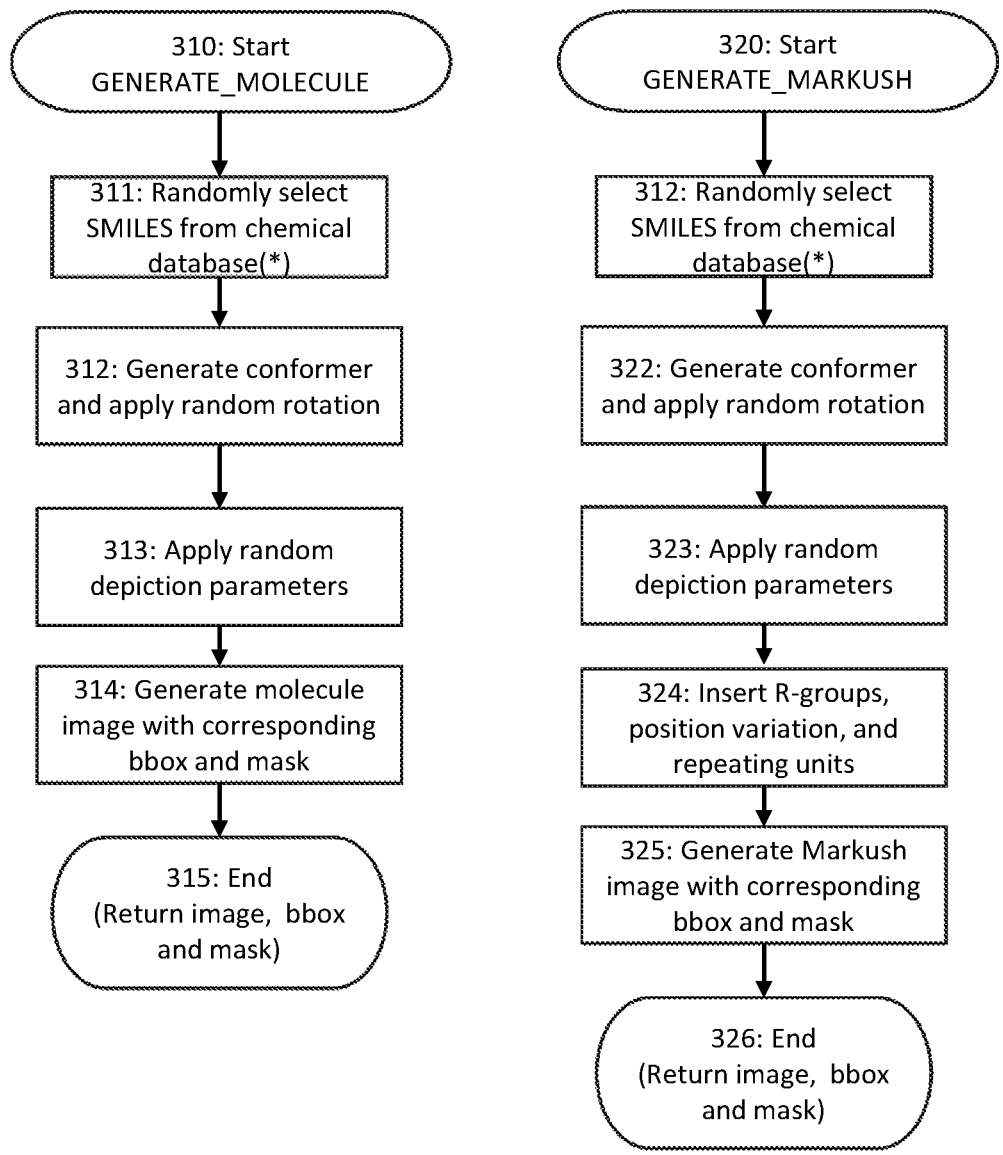
FIG. 3A shows a flow-chart of a method according to embodiments of the invention for generating molecules.
FIG. 3B shows a flow-chart of a method according to embodiments of the invention for generating Markush-structures.

FIG. 3A shows a flow-chart 301 of a method according to embodiments of the invention for generating molecules. The method may be performed by the content builder module 103 of FIG. 1. The method may be implemented as "GENERATE_MOLECULE" routine and may comprise the steps:

310: Start the "GENERATE_MOLECULE" routine.
311: Randomly select a molecule in SMILES-format from the respective chemical database.
312: Generate a conformer and apply random rotation.
313: Apply random depiction parameters.
314: Generate molecule image with corresponding bounding box and mask.
315: End method including return the molecule image including a corresponding bounding box and a corresponding mask.

FIG. 3B shows a flow-chart 302 of a method according to embodiments of the invention for generating Markush-structures. The method may be performed as well by the content builder module 103 of FIG. 1. The method may be implemented as "GENERATE_MARKUSH" routine and may comprise the steps:

320: Start the "GENERATE_MARKUSH" routine.
321: Randomly select a Markush-structure in SMILES format from the respective chemical database.
322: Generate conformer and apply random rotation.
323: Apply random depiction parameters.
324: Insert R-groups, position variation, and repeating units.
325: Generate Markush structure image with corresponding bounding box and mask.
326: End method including return the Markush-structure including a corresponding bounding box and a corresponding mask.

FIG. 4 shows a flow-chart 400 of a method according to embodiments of the invention for generating noise objects. The method may be implemented as "GENERATE_NOISE OBJECTS" routine and may comprise the steps:

410: Start the "GENERATE_NOISE_OBJECT" routine.
411: Randomly select an item object from a collection of noise objects.
412: End method including to return an image of the noise object.

FIG. 5 shows an exemplary example of a configuration file 500 embodying configuration date.

In the configuration file 500 exemplary parameters as follows may be specified:

"type": Generator class name
"dataset_size": Number of examples to generate
"split_ratios": Dict with the ratios for the 3 splits 'train', 'val', 'test'. The ratios should sum up to 1.0
"max_rowspan": Upper limit on the size of a rowspan measured in number of cells
"max_colspan": Upper limit on the size of a colspan measured in number of cells
"span_coverage": Min coverage ratio of the total span area over the total table area. In case 'header_spans_only' is true, the ratio is calculated over the area of the header only.
"header_rows_limits": The table header is always horizontal but can expand across many rows. The limits [a, b] indicate the height of the header in number of rows. The limit a must be at least 1
"header_spans_only": If true the spans are allowed only in the header
"styles": List of style (css) templates to be used in generation, when none defined-all of the found templates will be used
"source_images_dir": The root directory of the images of the source coco dataset
"source_ann_json": The labels.json annotation file of the source coco dataset
"source_images_quantiles_json": The json file with the quantiles of the source images
"content_quantile_mode": 'off': No quantiles are considered, 'table': Same source image quantiles across the whole table
"content_type_ratios": Dict with probabilities of each content type ['empty', 'trash', 'image']. The ratios must sum up to 1.0
"rendering_batch_size": Batch size for the html renderer
"save_dir": Directory, where to save data. This includes the generated images and annotation files
"save_debug": true/false: saves additional debug reports when true
"bucketing_cache": integer, used in ChemTabGenerator03, to provide image bucketing on the fly, for tighter layouts.

Figure 6:
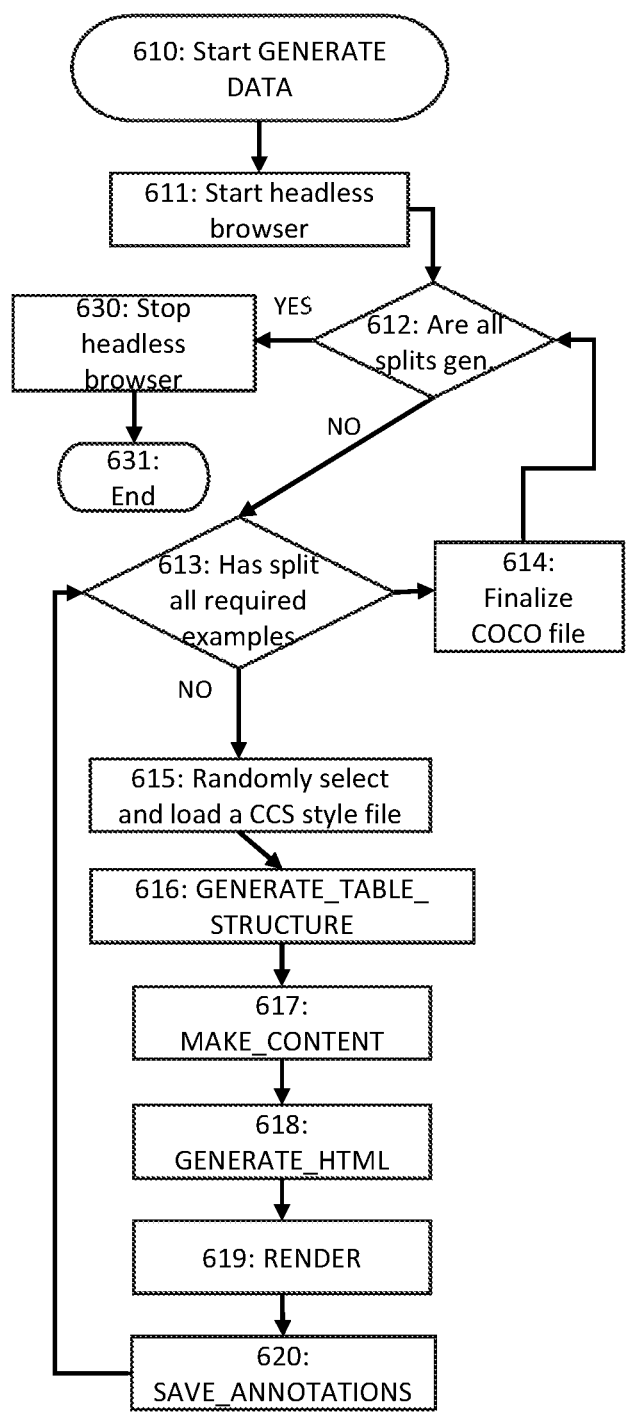
FIG. 6 shows a general flow-chart of method steps according to embodiments of the invention for generating synthetic data sets.

FIG. 6 shows a general or in other words main flow-chart 600 of method steps according to embodiments of the invention for generating synthetic data sets. The method may be implemented as "GENERATE DATA" routine and may comprise the steps:

610: Start the "GENERATE DATA" routine.
611: Start a headless browser.
612: Check if all splits have been generated. The splits may encompass a training split "train", a validation split "val" and a test split "test".
630: If all splits have been generated, stop the headless browser, and end the method at step 631.
613: Check if the respective split has all required examples. If yes, finalize the corresponding file, e.g., in COCO-format, at step 614 and continue with step 612.
615: If the respective split has not all required examples, generate iteratively all examples of the dataset. Start with randomly selecting and loading one style file, in particular one CSS style file.
616: Call the "GENERATE TABLE STRUCTURE" routine as described in more detail with reference to FIG. 7.

617: Call the "MAKE CONTENT" routine as described in more detail with reference to FIG. 8.

618: Call the "GENERATE HTML" routine as described in more detail with reference to FIG. 9.

619: Call the "RENDER" routine as described in more detail with reference to FIG. 10.

620: Call the "SAVE ANNOTATIONS" routine as described in more detail with reference to FIG. 11.

Figure 7:
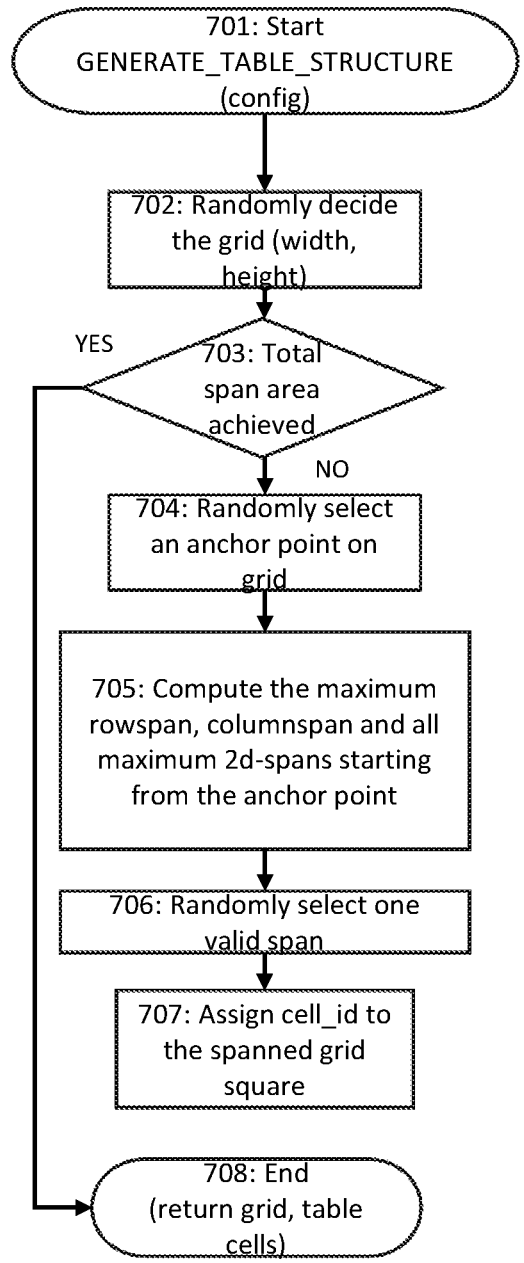
FIG. 7 shows a flow-chart of a method according to embodiments of the invention for generating a table structure.

FIG. 7 shows a flow-chart 700 of a method according to embodiments of the invention for generating a table structure. The method may be performed by the structure builder module 104 of FIG. 1. The method may be implemented as "GENERATE_TABLE_STRUCTURE" routine and may comprise the steps:

701: Start the "GENERATE_TABLE_STRUCTURE" routine.

702: Randomly decide on the grid size, i.e., the width and height of the grid.

703: Sum up the area of total spans and iterate until the configured total spanned area has been reached. When the total spanned area has been reached, go the step 708 and return the generated table grid and the information about the table cells. For each cell, it may be described what kind of span it should have. According to embodiments, options as follows may be available: row-span (vertical only span), column-span (horizontal only span), 2d span (both vertical and horizontal span).

During each iteration of the GENERATE_TABLE_STRUCTURE routine, steps as follows are performed.

704: Randomly select an available grid square as an "anchor point".

705: Based on the configuration and the grid geometry, compute the maximum row-span, column-span and all maximum 2d-spans starting from the anchor point.

706: Randomly select one valid span.

707: Assign cell_id to the spanned grid square.

Figure 8:
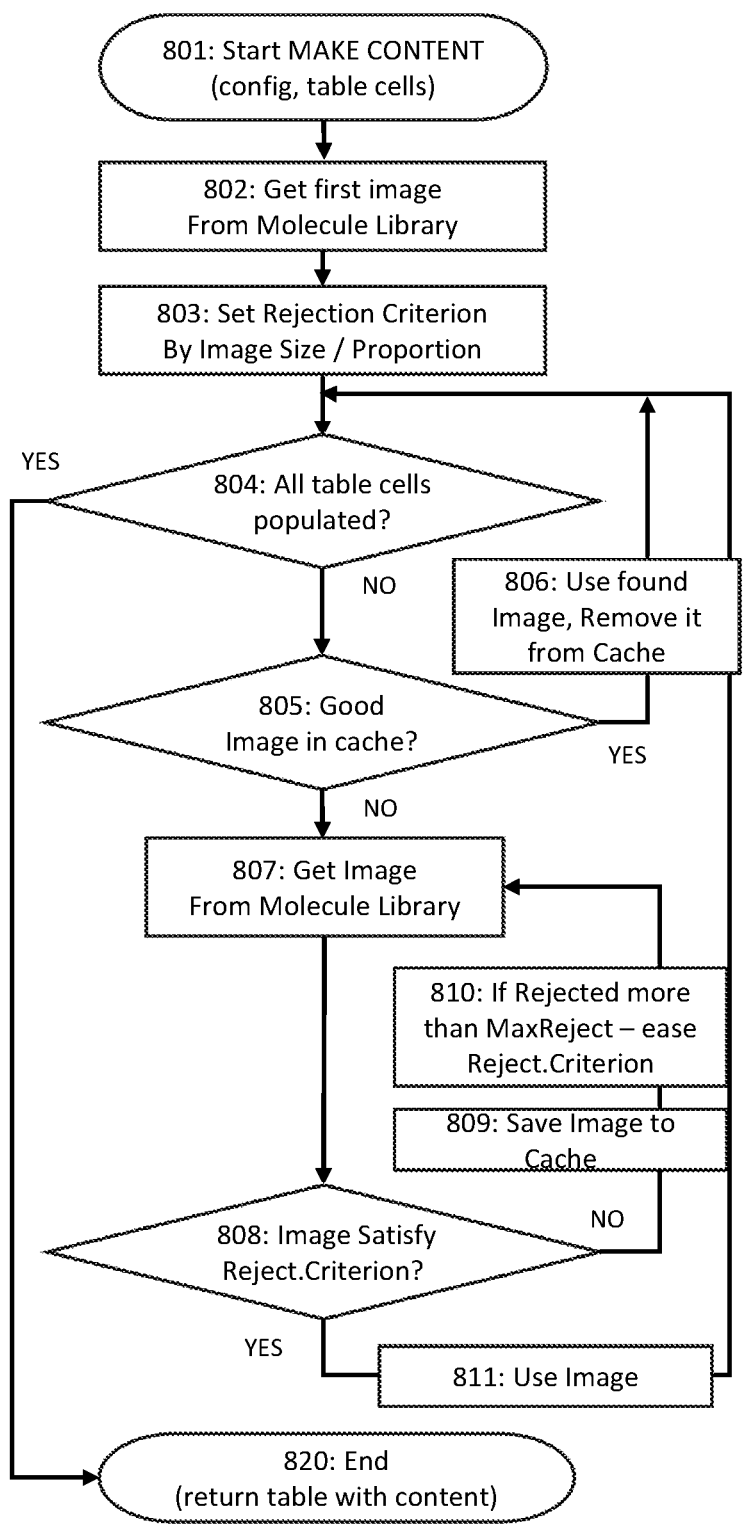
FIG. 8 shows a flow-chart of a method according to embodiments of the invention for generating chemical objects as content of chemical documents.

FIG. 8 shows a flow-chart 800 of a method according to embodiments of the invention for generating chemical objects as content of chemical documents. The method may be performed by the content builder module 103 of FIG. 1.

To build densely packed and realistic looking molecular atlases, embodiments of the invention use objects of similar size and proportions. According to embodiments, a cache may be used to store domain objects as components of atlases. The domain objects maybe sampled to find a suitable image that fits harmonically with the existing illustrations.

The method may be implemented as "MAKE CONTENT" routine and may comprise the steps:

801: Start the "MAKE CONTENT" routine.

802: Get the first domain object (image) from a chemical database or in other words molecule library.

803: Set a Rejection Criterion, i.e., a statement that checks if two images have similar size and proportions, within set tolerances.

804: Perform steps as follows in an iterative manner over all table cells until all table cells have been populated.

805: Check if there is an image in a cache that satisfies the Rejection Criterion with the first image (e.g., has similar size and proportions as the first image) and may be hence considered as a "good image".

806: If yes, populate content of a cell with found image, and remove this image from cache.

807: If not, then try with another Domain Object from the chemical database.

808: Repeat step 807 until a "good image" is found.

809: Save all "bad images" to cache.

810: If the cycle of steps 807 and 808 takes too many unsuccessful tries, increase the tolerances of size and proportions for the Rejection Criterion.

811: When "good image" is found-use it to populate content of table cell.

820: If all table cells have been populated, end method and return table with content.

Figure 9:
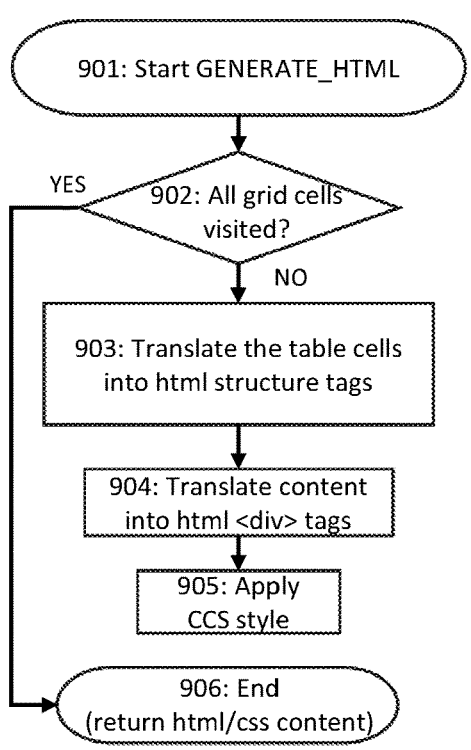
FIG. 9 shows a flow-chart of a method according to embodiments of the invention for generating an HTML-file.

FIG. 9 shows a flow-chart 900 of a method according to embodiments of the invention for generating an HTML-file. The method may be performed by the HTML-renderer module 105 of FIG. 1. The method may be implemented as "GENERATE_HTML" routine and may comprise the steps:

901: Start the "GENERATE_HTML" routine.

902: Iterate over all table cells the steps as follows:

903: Translate each of the table cells into html structure tags (<thead>, <tbody>, <tr>, <td>, rowspan, colspan).

904: Translate the chemical structures as embedded content, in particular Base64 embedded content, into html <div> tags.

905: Apply CSS style.

906: When all cells have been visited, return the complete html/css content.

Figure 10:
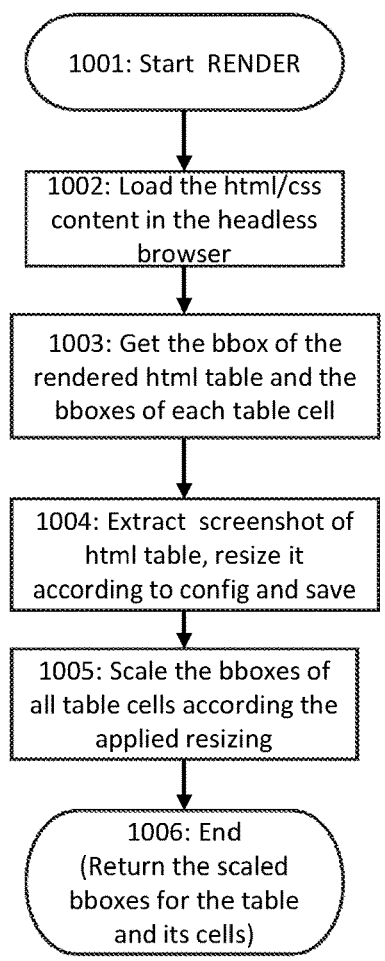
FIG. 10 shows a flow-chart of a method according to embodiments of the invention for rendering the generated content as returned by the method of FIG. 9.

FIG. 10 shows a flow-chart 1000 of a method according to embodiments of the invention for rendering the generated content as returned in step 906.

The method may be performed by the headless browser module 106 of FIG. 1. The method may be implemented as "RENDER" routine and may comprise the steps:

1001: Start the "RENDER" routine.

1002: Load the generated html/css content in the headless browser.

1003: Get the bounding box of the table and the bounding boxes of each table cell. In particular, use Javascript code on the rendered content to extract the bounding boxes of the table (as a whole) and each individual table cell.

1004: Extract screenshot of table. Resize the bounding boxes of the table and scale the table cells according to the configured image size.

1005: Scale the bounding boxes of all table cells and save the scaled table image, e.g. in a PNG file.

1006: Return the prepared bounding boxes of the table and the table cells.

Figure 11:
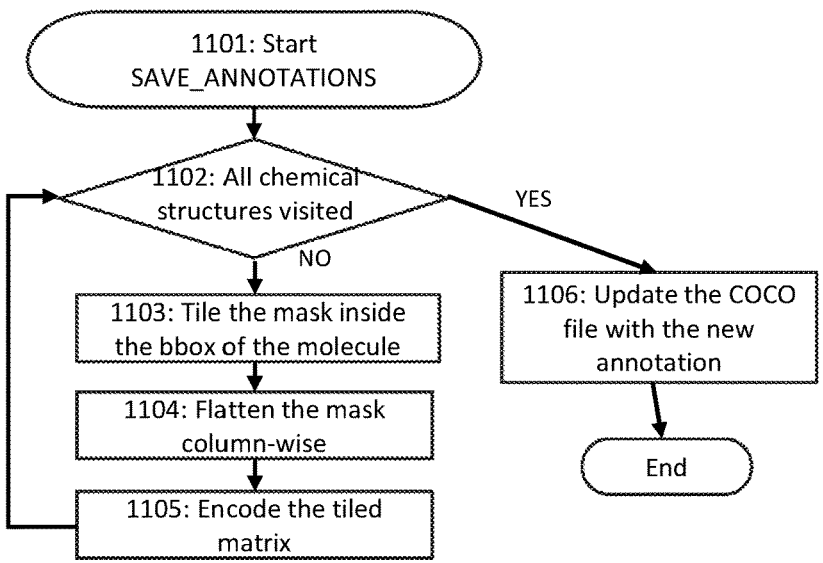
FIG. 11 shows a flow-chart of a method according to embodiments of the invention for saving annotations.

FIG. 11 shows a flow-chart 1100 of a method according to embodiments of the invention for saving annotations. The method may be implemented as "SAVE_ANNOTATIONS" routine and may comprise the steps:

1101: Start the "SAVE_ANNOTATIONS" routine.

1102: Iterate over all the generated chemical structures the following steps 1103-1105:

1103: Tile the mask of the original chemical structure inside the bounding box for the structure in the chemical document/atlas.

1104: Flatten the mask/matrix column-wise.

1105: Encode the tiled matrix, in particular RLE encode, and return the new encoded matrix.

1106: Once all chemical structures have been visited, save the annotation in the COCO file (split-specific).

FIGS. 12-15 show a plurality of exemplary synthetic datasets that may be generated by methods according to embodiments of the invention.

More particularly, FIG. 12 shows exemplary synthetic datasets 1200 where the generated chemical documents have a tabular structure.

FIG. 13 shows exemplary synthetic datasets 1300 where the generated chemical documents have a synthesis structure, in particular a template and examples. Please note that the examples are not actual chemical reactions, but exemplary images for chemical shapes recognition.

Figure 14:
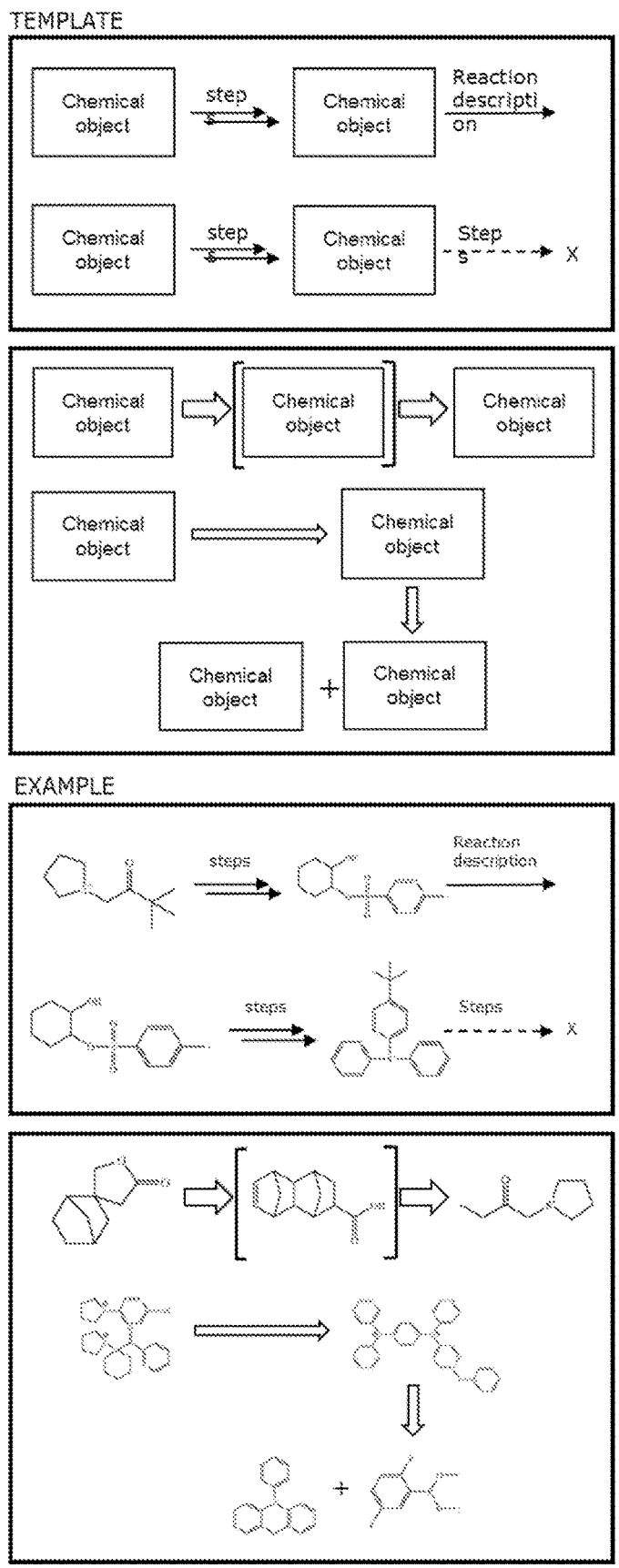
FIG. 14 shows exemplary synthetic datasets where the generated chemical documents have a retrosynthesis structure.

FIG. 14 shows exemplary synthetic datasets 1400 where the generated chemical documents have a retrosynthesis structure, in particular a template and examples. Please note that the examples are not actual chemical reactions, but exemplary images for chemical shapes recognition.

FIG. 15 shows exemplary synthetic datasets 1500 where the generated chemical documents have a circular reactions structure, in particular a template and examples. Please note that the examples are not actual chemical reactions, but exemplary images for chemical shapes recognition.

Figure 17:
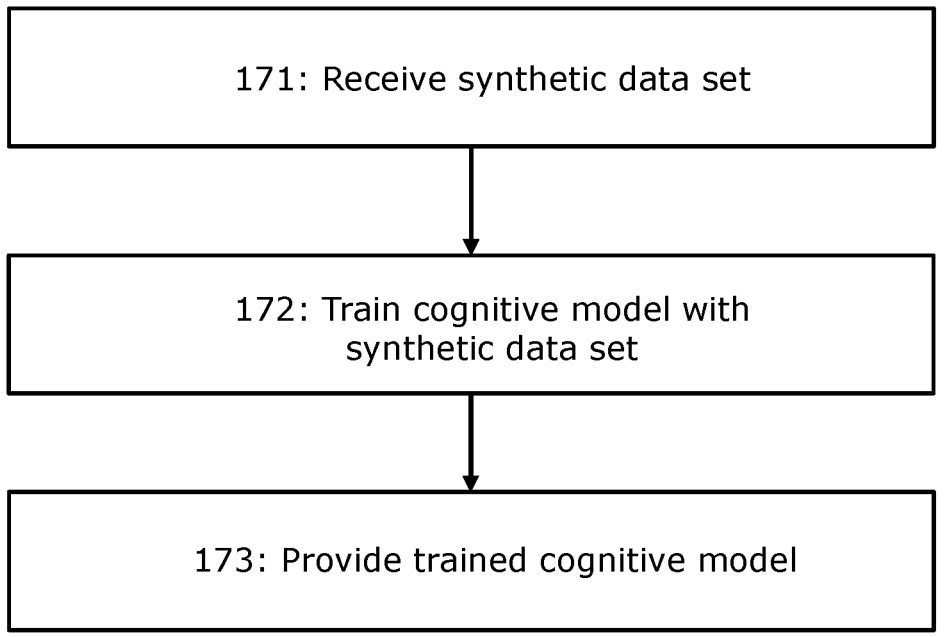
FIG. 17 shows a computer-implemented method for training an application for the analysis of chemical documents by means of a synthetic data set that has been generated by means of methods according to embodiments of the invention.

The synthetic data set that has been generated by means of methods according to embodiments of the invention may be used by a computer-implemented method 1700 for training an application for the analysis of chemical documents as illustrated in FIG. 17. At a step 171, a synthetic data set is received.

At a step 172, a training program uses the synthetic data set as training data set to train a cognitive model of the application for the analysis of chemical documents.

At a step 173, the training program provides the trained cognitive model as output.

Figure 18:
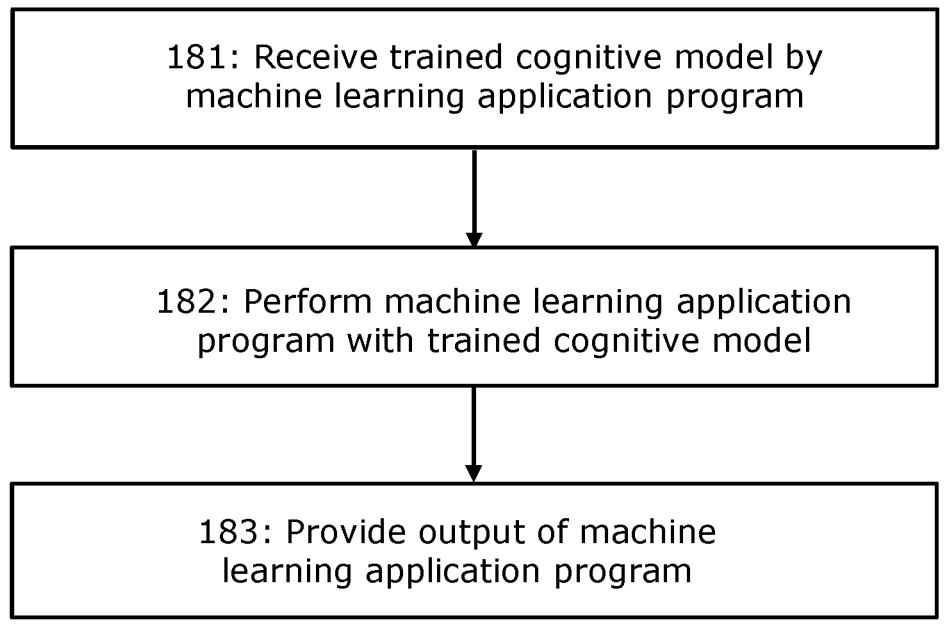
FIG. 18 shows a computer-implemented method for performing an application for the analysis of chemical documents.

Referring now to FIG. 18, a computer-implemented method 1800 for performing an application for the analysis of chemical documents is illustrated.

At a step 181, the application for the analysis of chemical documents receives the trained cognitive model.

At a step 182, the application for the analysis of chemical documents, in particular a machine learning program, uses the cognitive model to perform the application, in particular the machine learning program.

At a step 183, the application for the analysis of chemical documents provides one or more outputs.

The computer-implemented method 1800 as shown in FIG. 18 establishes an inference phase of the application for the analysis of chemical documents and its underlying algorithm.

Referring now to FIG. 16, a detailed embodiment of a computing system 1600 is illustrated on which methods according to embodiments of the invention may be performed. The computing system 1600 may be operational with numerous other general purpose or special purpose computing system environments or configurations. Examples of well-known computing systems, environments, and/or configurations that may be suitable for use with computing system 1600 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computing system 1600 may be described in the general context of computer system-executable instructions, such as program modules, being executed by a computer system. Generally, program modules may include routines, programs, objects, components, logic, data structures, and so on that perform particular tasks or implement particular abstract data types. The computing system 1600 is shown in the form of a general-purpose computing device. The components of computing system 1600 may include, but are not limited to, one or more processors or processing units 1616, a system memory 1628, and a bus 1618 that couples various system components including system memory 1628 to processor 1616.

Bus 1618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 1600 typically includes a variety of computer system readable media. Such media may be any available media that is accessible by computing system 1600, and it includes both volatile and non-volatile media, removable and non-removable media.

System memory 1628 can include computer system readable media in the form of volatile memory, such as random-access memory (RAM) 1630 and/or cache memory 1632. Computing system 1600 may further include other removable/non-removable, volatile/non-volatile computer system storage media. By way of example only, storage system 1634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1618 by one or more data media interfaces. As will be further depicted and described below, memory 1628 may include at least one program product having a set (e.g., at least one) of program modules that are configured to carry out the functions of embodiments of the invention.

Program/utility 1640, having a set (at least one) of program modules 1642, may be stored in memory 1628 by way of example, and not limitation, as well as an operating system, one or more application programs, other program modules, and program data. Each of the operating system, one or more application programs, other program modules, and program data or some combination thereof, may include an implementation of a networking environment. Program modules 1642 generally carry out the functions and/or methodologies of embodiments of the invention as described herein. Program modules 1642 may carry out in particular one or more steps of computer-implemented methods for synthetic data set generation according to embodiments of the invention.

Computing system 1600 may also communicate with one or more external devices 1615 such as a keyboard, a pointing device, a display 1624, etc.; one or more devices that enable a user to interact with computing system 1600; and/or any devices (e.g., network card, modem, etc.) that enable computing system 1600 to communicate with one or more other computing devices. Such communication can occur via Input/Output (I/O) interfaces 1622. Still yet, computing system 1600 can communicate with one or more networks such as a local area network (LAN), a general wide area network (WAN), and/or a public network (e.g., the Internet) via network adapter 1620. As depicted, network adapter 1620 communicates with the other components of computing system 1600 via bus 1618. It should be understood that although not shown, other hardware and/or software components could be used in conjunction with computing system 1600. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor/processing unit of the computing system 1600 to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method to generate a synthetic data set, the synthetic data set comprising a plurality of chemical documents, each of the plurality of chemical documents comprising a respective set of chemical objects, the method comprising:
receiving configuration data, the configuration data comprising a set of configuration parameters for the synthetic data set, wherein the synthetic data set is a large-scale object detection, segmentation, and captioning data set, which facilitates use of the generated synthetic data set to train artificial intelligence (AI) models;
performing, in an iterative manner, for each of the plurality of chemical documents:
generating, by a structure generation module, a chemical illustration atlas for a respective document structure for each of the plurality of chemical documents in accordance with the configuration data, wherein cascading style sheets (CSS) are used to diversify an appearance of each of the plurality of chemical documents;
generating, by a content generation module, the respective set of chemical objects as a plurality of images with complex chemical structures for each of the plurality of chemical documents; and
arranging the respective set of chemical objects on each of the plurality of chemical documents.

2. The computer-implemented method according to claim 1, wherein
the respective set of chemical objects are selected from a group consisting of: molecules, Markush structures, and reaction setups.

3. The computer-implemented method according to claim 1, wherein the respective document structure is selected from a group consisting of: a tabular structure, a synthesis structure, a retrosynthesis structure, and a circular reactions structure.

4. The computer-implemented method according to claim 1, wherein each of the plurality of chemical documents are embodied as single page documents or single image documents.

5. The computer-implemented method according to claim 1, wherein performing, in an iterative manner, for each of the plurality of chemical documents, further comprises:
selecting randomly, for each of the plurality of chemical documents, a style template from a set of style templates, the style template comprising style information; and
applying the style information of the style template on each of the plurality of chemical documents.

6. The computer-implemented method according to claim 1, wherein generating the respective set of chemical objects for each of the plurality of chemical documents, further comprises:
selecting randomly a chemical object file from a chemical database.

7. The computer-implemented method according to claim 6, wherein generating the respective set of chemical objects for each of the plurality of chemical documents, further comprises:
generating a conformer for the respective set of chemical objects;
applying a random rotation to the conformer; and
applying random depiction parameters to the conformer.

8. The computer-implemented method according to claim 4, wherein the single page documents or single image documents comprise an object file in SMILES-format.

9. The computer-implemented method according to claim 1, further comprising
randomly injecting noise objects into each of the plurality of chemical documents.

10. The computer-implemented method according to claim 9, wherein the noise objects are selected from a group consisting of: arrows, captions, text labels, plots, and/or technical drawings.

11. The computer-implemented method according to claim 1, further comprising:
converting each of the plurality of chemical documents into Hypertext Markup Language (HTML), thereby generating a set of HTML chemical documents.

12. The computer-implemented method according to claim 11, further comprising
loading the set of HTML chemical documents in a headless browser; and
saving the set of HTML chemical documents in a graphics format.

13. The computer-implemented method according to claim 12, wherein the graphics format is selected from a group consisting of: PNG-format, TIFF-format, or JPEG-format.

14. The computer-implemented method according to claim 1, further comprising:
training an application for analysis of each of the plurality of chemical documents, the method comprising:
receiving the synthetic data set; and
training a cognitive model with the synthetic data set.

15. A system for performing a computer-implemented method for generating a synthetic data set for applications for analysis of chemical documents, the synthetic data set comprising a plurality of chemical documents, each of the plurality of chemical documents comprising a respective set of chemical objects, the system comprising a processor and a computer readable memory, the system being configured to:
receive configuration data, the configuration data comprising a set of configuration parameters for the synthetic data set, wherein the synthetic data set is a large-scale object detection, segmentation, and captioning data set, which facilitates use of the generated synthetic data set to train artificial intelligence (AI) models;
perform, in an iterative manner, for each of the plurality of chemical documents:
generate, by a structure generation module, a chemical illustration atlas for a respective document structure for each of the plurality of chemical documents in accordance with the configuration data, wherein cascading style sheets (CSS) are used to diversify an appearance of each of the plurality of chemical documents;
generate, by a content generation module, the respective set of chemical objects as a plurality of images with complex chemical structures for each of the plurality of chemical documents; and arrange the respective set of chemical objects on each of the plurality of chemical documents.

16. The system according to claim 15, wherein the respective set of chemical objects are selected from a group consisting of: molecules, Markush structures, and reaction setups.

17. The system according to claim 15, wherein the respective document structure is selected from a group consisting of: a tabular structure, a synthesis structure, a retrosynthesis structure, and a circular reactions structure.

18. The system according to claim 15, wherein each of the plurality of chemical documents are embodied as single page documents or single image documents.

19. The system according to claim 15, wherein performing, in an iterative manner, for each of the plurality of chemical documents, further comprises:

selecting randomly, for each of the plurality of chemical documents, a style template from a set of style templates, the style template comprising style information; and applying the style information of the style template on each of the plurality of chemical documents.

20. A computer program product for generating a synthetic data set for applications for analysis of chemical documents by a system comprising a processor and computer readable memory, the synthetic data set comprising a plurality of chemical documents, each of the plurality of chemical documents comprising a respective set of chemical objects, the computer program product comprising a non-transitory computer readable storage medium having program instructions embodied therewith, the program instructions executable by the system to cause the system to perform a method comprising:

receiving configuration data, the configuration data comprising a set of configuration parameters for the synthetic data set, wherein the synthetic data set is a large-scale object detection, segmentation, and captioning data set, which facilitates use of the generated synthetic data set to train artificial intelligence (AI) models;

performing, in an iterative manner, for each of the plurality of chemical documents:

generating, by a structure generation module, a chemical illustration atlas for a respective document structure for each of the plurality of chemical documents in accordance with the configuration data, wherein cascading style sheets (CSS) are used to diversify an appearance of each of the plurality of chemical documents;

generating, by a content generation module, the respective set of chemical objects as a plurality of images with complex chemical structures for each of the plurality of chemical documents; and arranging the respective set of chemical objects on each of the plurality of chemical documents.

\* \* \* \* \*